US007208022B2

(12) United States Patent
Corkwell et al.

(10) Patent No.: US 7,208,022 B2
(45) Date of Patent: Apr. 24, 2007

(54) ETHANOL-DIESEL FUEL COMPOSITION AND METHODS THEREOF

(75) Inventors: Keith C. Corkwell, Newbury, OH (US); Daniel T. Daly, Tuscaloosa, AL (US); Mitchell M. Jackson, Chagrin Falls, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 10/507,284

(22) PCT Filed: Mar. 13, 2003

(86) PCT No.: PCT/US03/07573

§ 371 (c)(1),
(2), (4) Date: Sep. 10, 2004

(87) PCT Pub. No.: WO03/078552

PCT Pub. Date: Sep. 25, 2003

(65) Prior Publication Data

US 2005/0166447 A1    Aug. 4, 2005

Related U.S. Application Data

(60) Provisional application No. 60/426,199, filed on Nov. 14, 2002, provisional application No. 60/418,935, filed on Oct. 16, 2002, provisional application No. 60/364,256, filed on Mar. 14, 2002.

(51) Int. Cl.
*C10L 1/18* (2006.01)
*C10L 1/22* (2006.01)

(52) U.S. Cl. .............................. 44/331; 44/415; 44/451

(58) Field of Classification Search ................. 44/415, 44/451
See application file for complete search history.

(56) References Cited

U.S. PATENT DOCUMENTS

| | | | |
|---|---|---|---|
| 3,637,357 A * | 1/1972 | Nixon et al. ................... | 44/301 |
| 4,227,889 A | 10/1980 | Perilstein | |
| 4,242,099 A | 12/1980 | Malec | |
| 4,395,267 A | 7/1983 | Sweeney | |
| 4,397,655 A | 8/1983 | Sweeney | |
| 4,398,921 A * | 8/1983 | Rifkin et al. ................... | 44/351 |
| 4,451,265 A | 5/1984 | Schwab | |
| 4,456,454 A * | 6/1984 | Jenkins, Jr. ................... | 44/386 |
| 4,477,258 A | 10/1984 | Lepain | |
| 4,509,950 A * | 4/1985 | Baker ........................... | 44/302 |
| 5,360,460 A | 11/1994 | Mozdzen et al. | |
| 6,017,369 A | 1/2000 | Ahmed | |
| 6,129,773 A * | 10/2000 | Killick et al. ................... | 44/388 |
| 6,190,427 B1 | 2/2001 | Ahmed | |
| 6,306,184 B2 | 10/2001 | Ahmed | |
| 6,348,074 B2 | 2/2002 | Wenzel | |
| 6,913,630 B2 * | 7/2005 | Filippini et al. ............... | 44/301 |
| 2001/0003881 A1 | 6/2001 | Ahmed | |
| 2002/0014033 A1 | 2/2002 | Langer et al. | |
| 2002/0020106 A1 | 2/2002 | Filippini et al. | |
| 2003/0033748 A1* | 2/2003 | Wenzel ......................... | 44/302 |
| 2004/0068922 A1* | 4/2004 | Barbour et al. ............... | 44/418 |

FOREIGN PATENT DOCUMENTS

| | | |
|---|---|---|
| EP | 0014992 | 9/1980 |
| EP | 0117915 | 9/1984 |
| FR | 2544738 | 10/1984 |
| WO | 93/245939 | 12/1993 |
| WO | 95/02654 | 1/1995 |
| WO | 98/56878 | 12/1998 |
| WO | 00/36055 | 6/2000 |
| WO | 01/04239 | 1/2001 |
| WO | 01/10982 | 2/2001 |
| WO | 01/44413 | 6/2001 |
| WO | 01/62876 | 8/2001 |
| WO | 01/62877 | 8/2001 |
| WO | 02/068334 | 9/2002 |

OTHER PUBLICATIONS

Lewis, Sr., Richard J.; Hawley's Condensed Chemical Dictionary 13th Ed., John Wiley & Sons, New York, 1997 (p. 1066).*

* cited by examiner

*Primary Examiner*—Vasu Jagannathan
*Assistant Examiner*—Vickey Ronesi
(74) *Attorney, Agent, or Firm*—Jason S. Fokens; Teresan W. Gilbert

(57) ABSTRACT

A fuel composition for use in an internal combustion engine containing (a) a diesel fuel, (b) ethanol, (c) a surfactant, and optionally (d) a combustion improver, which provides lubricity to the engine and reduces exhaust emissions.

17 Claims, No Drawings

ETHANOL-DIESEL FUEL COMPOSITION AND METHODS THEREOF

This application claims the benefit of U.S. Provisional Application Nos. 60/364,256 filed 14 Mar. 2002, 60/418,935 filed 16 Oct. 2002, and 60/426,199 filed 14 Nov. 2002.

BACKGROUND OF THE INVENTION

1. Field of the Invention

This invention relates to a fuel composition containing a normally liquid fuel such as a hydrocarbon fuel and ethanol and to methods that employ the fuel composition. The fuel composition and methods thereof provide overall improved performance for using the fuel composition in an internal combustion engine.

2. Description of the Related Art

Using ethanol in gasoline is well established around the world. Alternatively, ethanol is generally not used in diesel fuel due particularly to severe stability problems when water is present. The technology of mixing ethanol and diesel fuel has received much attention since the oil shortage crisis during the years between 1970 and 1980. However, ethanol-diesel fuel mixtures have suffered in a variety of performance areas: stability, corrosion, reduced power, lubricity, and low temperature properties. Ethanol-diesel fuel mixtures, especially in the presence of water and/or low temperatures, tend to be unstable resulting in separation to polar and nonpolar phases. The corrosive properties of ethanol were traced back to the instability of the mixture when exposed to contaminant water in the fuel delivery system. This stability problem resulted in the fuel pump and injection equipment being exposed to high concentrations of ethanol and water. Moreover, this mixture suffered from reduced combustibility properties when compared to a diesel fuel that was a conventional middle distillate fuel. The reduced combustibility is expressed as poorer start-up performance, reduced power and increased emissions. Reduced combustibility can be attributed, at least in part, to the lower BTU content of ethanol versus a middle distillate fuel. Thus, while the use of ethanol in diesel fuel systems can offer economic and environmental advantages from a renewable fuel point of view, the presence of water creates difficult technical problems involving storage and use of such fuels. Even if a small quantity of water gets into a diesel fuel containing ethanol, a polar phase containing ethanol will separate. The sources of this water can be the water that is difficult to remove from ethanol, or water that can be picked up by the ethanol-diesel fuel mixture from the environment. The problems associated with phase stability, which refers to the ability of the fuel to refrain from separating into component phases, can be addressed in principle by using either microemulsion or macroemulsion technology.

Hybrid fuel emulsions have been developed to improve the water tolerance of ethanol-diesel fuel mixtures in terms of phase stability so that these mixtures will remain in a single phase when exposed to water. Such emulsions include, for example, a mixture of diesel fuel, an alcohol, small amounts of water, and a surfactant system. A number of patents, including U.S. Pat. Nos. 6,129,773; 6,348,074; 4,477,258; 4,451,265 and International Publication Nos. WO 01/10982 A1 and WO 95/02654, describe surfactant systems containing long-chain fatty acids or derivatives thereof.

Various patents have published or issued which relate to emulsified fuel compositions and which specifically relate to compositions comprised of diesel fuel, water or ethanol, and surfactant. In International Publication No. WO 93/24593 and European Publication No. EP 117915 A2, alcohols ($C_1$ to $C_{12}$) are disclosed for use in water-diesel fuel or ethanol-diesel fuel mixtures to impart phase stability. Typical alcohols used were propanol, butanol, hexanol, and dodecanol.

The use of alkoxylated fatty alcohols and fatty acids as a stabilizing additive for diesel fuel containing ethanol has been disclosed in U.S. Pat. Nos. 6,306,184; 6,190,427; 6,017,369; and 6,348,074 and in International Publication Nos. WO 00/36055 A1; WO 01/62877 A1; WO 01/62876 A1; WO 01/44413 A2 and WO 01/10982 A1, and in U.S. Pub. No. US 2001/0003881 A1.

International Publication No. WO 02/068334 A1 discloses combustion modifiers for water-blended fuels, to include diesel fuels containing an alcohol, to reduce exhaust emissions of an internal combustion engine.

The present invention provides an ethanol-diesel fuel composition that contains a surfactant such that the fuel composition has excellent performance in terms of phase stability and lubricity. The present invention further provides improved performance in terms of exhaust emissions when a combustion improver is added to the fuel composition.

SUMMARY OF THE INVENTION

An object of the present invention is to provide a phase stable ethanol-diesel fuel composition.

Another object of the invention is to provide an ethanol-diesel fuel composition having improved lubricity.

A further object of this invention is to provide an ethanol-diesel fuel composition that reduces exhaust emissions of a compression-ignited internal combustion engine.

Additional objects and advantages of the present invention will be set forth in the Detailed Description which follows and, in part, will be obvious from the Detailed Description or may be learned by the practice of the invention. The objects and advantages of the invention may be realized by means of the instrumentalities and combinations pointed out in the appended claims.

To achieve the foregoing objects in accordance with this invention as described and claimed herein, a fuel composition comprises (a) a diesel fuel; (b) ethanol; and (c) a surfactant comprising (1) a hydrocarbylphenol or derivative thereof that is a Mannich base or an alkoxylated Mannich base; (2) a hydrocarbyl-substituted polycarboxylic acid or anhydride or derivative thereof; (3) a derivative of a hydrocarbyl alcohol that is an acetal, a ketal, or an orthoester; or (4) a mixture thereof wherein the hydrocarbyl substituent of components (c)(1) and (c)(2) contains 4 to 20 carbon atoms, and the hydrocarbyl substituents of component (c)(3) contain 1 to 7 carbon atoms.

In another embodiment of the invention the fuel composition further comprises (d) a combustion improver.

In a further embodiment of the invention a method of providing a stable fuel composition to a compression-ignited internal combustion engine, wherein the fuel composition provides improved lubricity and reduced exhaust emissions, comprises operating the engine with the fuel composition of the present invention that contains the surfactant component (c) and the combustion improver component (d).

DETAILED DESCRIPTION OF THE INVENTION

A fuel composition of the present invention comprises (a) a diesel fuel; (b) ethanol; and (c) a surfactant comprising (1) a hydrocarbylphenol or derivative thereof that is a Mannich base or an alkoxylated Mannich base; (2) a hydrocarbyl-substituted polycarboxylic acid or anhydride or derivative thereof; (3) a derivative of a hydrocarbyl alcohol that is an acetal, a ketal, or an orthoester; or (4) a mixture thereof wherein the hydrocarbyl substituent of components (c)(1) and (c)(2) contains 4 to 20 carbon atoms, and the hydrocarbyl substituents of component (c)(3) contain 1 to 7 carbon atoms.

As used herein, the terms "hydrocarbyl" and "hydrocarbon based" mean that the group being described has predominantly hydrocarbon character within the context of this invention. These include groups that are purely hydrocarbon in nature, that is, they contain only carbon and hydrogen. They may also include groups in the hydrocarbon or attached to the hydrocarbon containing substituents or atoms that do not alter the predominantly hydrocarbon character of the group. Such substituents may include halo-, alkoxy-, nitro-, etc. These groups may also contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms provided that they do not adversely affect reactivity or utility of the process or products of this invention.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is, they are essentially free of atoms other than carbon and hydrogen.

The fuel composition of the present invention contains (a) a diesel fuel. Any diesel fuel that meets the requirements set forth in ASTM procedure D975 is useful in this invention. The diesel fuel can be a hydrocarbon fuel to include middle distillate fuels obtained from the refining of a petroleum or mineral oil source and fuels from a synthetic process such as a Fischer-Tropsch fuel from a Fischer-Tropsch process. Middle distillate fuels generally have a distillation temperature range of 121 to 371° C., which is greater than that of gasoline or naphtha with some overlap. Middle distillate fuels include distillation fractions for diesel, jet, heating oil, gas oil, and kerosene. The diesel fuel can be a biodiesel fuel. Biodiesel fuels can be derived from animal fats and/or vegetable oils to include biomass sources such as plant seeds as described in U.S. Pat. No. 6,166,231. Biodiesel fuels include esters of naturally occurring fatty acids such as the methyl ester of rapeseed oil which can generally be prepared by transesterifying a triglyceride of a natural fat or oil with an aliphatic alcohol having 1 to 10 carbon atoms. In an embodiment of the invention the diesel fuel comprises a middle distillate fuel, a Fischer-Tropsch fuel, a biodiesel fuel, or mixtures thereof. A mixture can be, for example, a mixture of one or more distillate fuels and one or more biodiesel fuels or a mixture of two or more biodiesel fuels. Middle distillate fuels generally contain aromatic hydrocarbons, as illustrated in Table 1 below, which tend to be a source of atmospheric pollution. Middle distillate fuels can contain very high levels of aromatic hydrocarbons near 85% by volume or very low levels of aromatic hydrocarbons near 3% by volume when highly refined to meet environmental regulations and in other instances can contain aromatic hydrocarbons from 3 to 60% by volume and from 3 to 40% by volume. The diesel fuel can be present in the fuel composition of the present invention at 50 or 55 to 99% by weight and in other instances at 60 to 97% by weight, at 65 to 95% by weight, at 70 to 99% by weight, and at 87 to 95% by weight.

TABLE 1

Fuel Properties for a Middle Distillate Diesel Fraction

| Fuel | Aromatic Content | Unsaturates Content | Sulfur, ppm | Temp for 90% distilled, ° C. | Cloud Pt. (ASTM D2500) |
|---|---|---|---|---|---|
| A | 20% | 1.4% | 282 | 298 | −5° C. |
| B | 30% | 1% | 408 | 322 | −18.4° C. |
| C | 21.8% | 1.1% | 104 | 334 | −6.5° C. |
| D | 17.2% | 1.7% | 560 | 355 | 5.4° C. |
| E | 28.4% | 1.3% | 1750 | 359 | −4.7° C. |
| F | 4.3% | 0.3% | 19 | 154 | −21.2° C. |

The fuel composition of the present invention contains (b) ethanol. An advantage of using an ethanol-diesel fuel composition is that ethanol can be obtained from renewable plant sources such as grain and sugar cane via fermentation of plant sugars and starches. In an embodiment of the invention ethanol can be anhydrous ethanol, fuel grade ethanol, hydrous ethanol, or mixtures thereof. For the purposes of this invention, anhydrous ethanol is defined as ethanol that is substantially free of water, that is, there is no more than a minor, impurity amount of water which has no significant measurable effect on performance or stability of a diesel fuel composition containing the ethanol. Anhydrous ethanol, as defined herein, may contain up to about 0.1% by weight water, frequently from about 0.01% to 0.1%, more frequently up to about 0.05% by weight of water. Fuel grade ethanol can contain up to about 0.1% by weight water. Hydrous ethanol contains more than the 0.1% upper amount specified for anhydrous ethanol, often up to about 7% by weight, more often up to about 3% by weight water. Small amounts of water in anhydrous ethanol, as defined hereinabove, frequently arise from unintentional contamination, such as by absorption from moist air. Greater amounts can arise from processing, for example from fermentation of grain yielding an azeotropic ethanol-water mixture. In an embodiment of the fuel composition of the invention ethanol comprises anhydrous ethanol, fuel grade ethanol containing up to 0.1% by weight water, hydrous ethanol containing up to 7% by weight water, or mixtures thereof. Ethanol can be present in the fuel composition of the present invention at 0.5 to 25% by weight and in other instances at 0.5 to 20% by weight, at 3 to 20% by weight, at 3 to 15% by weight, and at 5 to 10% by weight.

The ethanol-diesel fuel composition of this invention contains (c) a surfactant that provides stability and improved lubricity to the fuel composition.

The fuel composition has stability by remaining or by tending to remain as a single phase under conditions encountered in storage and in use in a fuel system of a diesel engine. The fuel composition has improved lubricity by providing improved wear performance or a reduction in the wear of components in a fuel system of a diesel engine such as fuel injectors and rotary fuel pumps.

The surfactant (c) can be (1) a hydrocarbylphenol or a derivative thereof that is a Mannich base or an alkoxylated Mannich base. The hydrocarbylphenol can be an alkylphenol where the alkyl substituent has 4 to 20 carbon atoms. The alkyl substituent can be derived from an alkene or from a mixture of alkenes where each alkene has a different number of carbon atoms such as a mixture of $C_{12}$ and $C_{14}$ alkenes. The alkene can be linear, branched, or a mixture thereof. The alkene can be an alpha-olefin or 1-alkene, an internal alkene, or a mixture thereof. The alkylphenols can be prepared by alkylating phenol with alkenes by well known methods and are commercially available. Useful alkylphenols include heptylphenol and dodecylphenol derived from a polypropylene tetramer.

The Mannich base can be the reaction product of a hydrocarbyl-substituted hydroxy-containing aromatic compound, an aldehyde, and an amine. The hydrocarbyl substituent can have 4 to 20 carbon atoms and in other instances 6 to 18 carbon atoms and 8 to 18 carbon atoms. The hydroxy-containing aromatic compound can include phenol, a cresol such as ortho-cresol, resorcinol, catechol, or a naphthol. The hydrocarbyl-substituted hydroxy-containing aromatic compound can be a hydrocarbylphenol or an alkylphenol where the alkyl group is derived from an alkene as described above for the hydrocarbylphenol surfactant (c)(1). The aldehyde can have 1 to 10 carbon atoms and includes formaldehyde or a reactive equivalent thereof such as formalin, paraformaldehyde, trioxane and dimethoxymethane. The amine has at least one reactive nitrogen to hydrogen N—H bond and can include ammonia, a monoamine, a polyamine, or a mixture thereof. The monoamine and polyamine can be an alkanolamine that contains at least one hydroxyl group. Useful amines include ethylamine, dimethylamine, ethanolamine, diethanolamine, ethylenediamine, 2-(2-aminoethylamino)ethanol, and polyalkylenepolyamines such as polyethylenepolyamines. The Mannich base can be prepared by reacting a hydrocarbylphenol or an alkylphenol, an aldehyde and an amine as described in U.S. Pat. No. 5,697,988. The mole ratio of the Mannich base reactants can vary and includes an alkylphenol to aldehyde to amine mole ratio of 1:0.8-1.2:0.8-1.2. In an embodiment of the invention the Mannich base is the reaction product of dodecylphenol, formaldehyde, and diethanolamine.

The alkoxylated Mannich base can be the reaction product of the above described Mannich base and an epoxide or a mixture of two or more epoxides. The mole ratio of the Mannich base to epoxide can be 1:1-30 and in other instances can be 1:1-24 and 1:1-20. The epoxide can have 2 to 18 carbon atoms and includes ethylene oxide, propylene oxide and butylene oxide. The alkoxylated Mannich base can be prepared by known methods such as reacting a mixture of a Mannich base and an epoxide at a temperature of ambient to 160° C.

The surfactant (c) can be (2) a hydrocarbyl-substituted polycarboxylic acid or anhydride or derivative thereof. The hydrocarbyl substituent of the polycarboxylic surfactant component (c)(2) can have 4 to 20 carbon atoms and in other embodiments can have 6 to 18 carbon atoms, 8 to 18 carbon atoms, and 12 to 18 carbon atoms. The polycarboxylic acid or anhydride can have two or more carboxyl groups, one or more anhydride groups, or one or more carboxyl groups and one or more anhydride groups. The hydrocarbyl substituent can be an aliphatic group to include an alkyl or an alkenyl group. The alkenyl group can be derived from an alkene as described above for the hydrocarbylphenol surfactant (c)(1). In an embodiment of the invention the hydrocarbyl-substituted polycarboxylic acid or anhydride is a hydrocarbyl-substituted succinic acid or anhydride, and in another embodiment the hydrocarbyl-substituted succinic acid or anhydride is an alkenylsuccinic acid or anhydride. Alkenylsuccinic acids or anhydrides can be prepared by well known methods such as reacting a mixture of maleic anhydride and an alkene at 100 to 250° C. and are commercially available. Derivatives of the hydrocarbyl-substituted polycarboxylic acid or anhydride include a reaction product of the polycarboxylic acid or anhydride and an alcohol, an amine, an amino alcohol, an epoxide, or a mixture thereof. These derivatives can be prepared by well known methods. The alcohol can be a monohydric alcohol, a polyhydric alcohol, or a mixture thereof and includes alcohols such as ethanol, 2-ethyl-1-hexanol, ethylene glycol, glycerol and pentaerythritol. The amine can be ammonia, a monoamine, a polyamine, or a mixture thereof and includes amines such as butylamine, ethylenediamine and polyethylenepolyamines. The amino alcohol can have one or more hydroxyl groups and includes monoamines and polyamines such as ethanolamine, diethanol amine, N,N-dimethylethanol amine, and 2-(2-aminoethylamino)ethanol. The epoxide can have 2 to 18 carbon atoms and in another embodiment can have 2 to 4 carbon atoms to include ethylene oxide, propylene oxide, and butylene oxide. Also included are mixtures of two or more epoxides. The degree of alkoxylation or mole ratio of the polycarboxylic acid or anhydride to epoxide can be 1 to 50 and in other instances can be 1 to 20 and 1 to 10. The polycarboxylic acid or anhydride can be alkoxylated by reaction with a glycol such as ethylene glycol or a poly (alkylene glycol) such as a poly(ethylene glycol) as described in International Publication No. WO 01/62877 A1. In an embodiment of the invention the polycarboxylic acid or anhydride derivative is an alkenylsuccinic acid or anhydride derivative. The alkenylsuccinic acid or anhydride derivative can include a diester, an ester-acid, an imide, a diamide, an amide-acid, an amide-amine salt, a bis amine salt, an amide-ester, an ester-amine salt, and monoalkoxylated and/or polyalkoxylated acids and anhydrides. In another embodiment of the invention the derivative of the hydrocarbyl-substituted polycarboxylic acid or anhydride of component (c)(2) is the reaction product of an alkenylsuccinic anhydride and a tertiary amino alcohol.

The surfactant (c) can be (3) a derivative of a hydrocarbyl alcohol that is an acetal, a ketal, or an orthoester. The hydrocarbyl substituents of the acetal, ketal, or orthoester can contain 1 to 7 carbon atoms. The hydrocarbyl substituents can be hydrocarbon groups to include alkyl and cycloalkyl groups. The hydrocarbon groups can have 1 to 7 carbon atoms and in another instance can have 1 to 4 carbon atoms. Acetals, ketals and orthoesters can be prepared by well known methods, are also commercially available, and can include for example diethoxymethane and 2,2-diethoxypropane and triethyl orthoacetate.

The surfactant (c) can be a mixture (4) of the components of (c)(1) and (c)(2) and (c)(3). The mixture (c)(4) can be a mixture of two or more subcomponents taken from a single component such as for example a mixture of a hydrocarbylphenol and a Mannich base, a mixture of two polycarboxylic acid or anhydride derivatives, or a mixture of an acetal and a ketal. The mixture (c)(4) can be a mixture of two or more subcomponents taken from two or more different components such as for example a mixture of a hydrocarbylphenol and a derivative of a polycarboxylic acid or anhydride, a mixture of a Mannich base and an acetal, or a mixture of a polycarboxylic anhydride and a ketal.

In an embodiment of the invention the surfactant (c) comprises the Mannich base, the alkoxylated Mannich base, the acetal, the ketal, the orthoester, or a mixture thereof as described hereinabove. In another embodiment of the invention the surfactant (c) comprises the hydrocarbyl-substituted polycarboxylic acid or anhydride or derivative thereof as described above. In a further embodiment of the invention the surfactant (c) comprises a hydrocarbylphenol as described above.

The surfactant (c) of the present invention can further comprise at least one member selected from the group consisting of an alcohol, an alkoxylated alcohol, a fatty monocarboxylic acid or derivative thereof, and an alkoxylated hydrocarbylphenol. The surfactant (c) can include one or more subcomponents from components (c)(1), (c)(2) and (c)(3) as described above for components (c)(1) through (c)(4) and can further include one or more members selected from the group consisting of an alcohol, an alkoxylated alcohol, a fatty monocarboxylic acid or derivative thereof, and an alkoxylated hydrocarbylphenol. Surfactant (c) can be, for example, a combination of an alkylphenol, a fatty monocarboxylic acid or derivative thereof, a polycarboxylic acid or anhydride or derivative thereof, and an alcohol; a combination of an alkylphenol and a fatty monocarboxylic acid or derivative thereof; and a combination of a Mannich base and an alcohol.

The surfactant (c) alcohol can be a hydrocarbyl alcohol and in another instance can be an aliphatic alcohol. The alcohol can have 4 to 20 carbon atoms and in other instances can have 6 to 18 carbon atoms, and 12 to 18 carbon atoms. The alcohol can structurally be linear, branched, cyclic, or a mixture thereof. The alcohol can be saturated, unsaturated, or a mixture thereof. The alcohol can be a single alcohol or a mixture of two or more alcohols differing in number of carbon atoms and/or degree of saturation and/or structure. Alcohols are commercially available and can include methanol, propanols, butanols, pentanols, hexanols, octanols and decanols. Useful alcohols include isopropyl alcohol, butanol, amyl alcohol, hexanol, 2-ethyl-1-hexanol and isooctyl alcohol.

The surfactant (c) alkoxylated alcohol includes the above-described alcohol that can be alkoxylated with one or more units of an epoxide as described above for the alkoxylated Mannich base of surfactant component (c)(1). Alkoxylated alcohols are commercially available and can be prepared by known methods.

The surfactant (c) fatty monocarboxylic acid can have 4 to 20 carbon atoms and in other instances can have 6 to 18 carbon atoms, and 12 to 18 carbon atoms. The fatty acid can structurally be linear, branched, or a mixture thereof. The fatty acid can be saturated, unsaturated, or a mixture thereof. The fatty acid can be a single acid or a mixture of two or more acids differing in the number of carbon atoms and/or structure and/or degree of saturation. Fatty monocarboxylic acids are commercially available and can include caproic acid, capric acid, lauric acid, oleic acid, isostearic acid and tall oil fatty acid. The derivative of the fatty monocarboxylic acid can be the reaction product of the fatty monocarboxylic acid and an alcohol, an amine, an amino alcohol, an epoxide, or a mixture thereof. The derivatives of the fatty monocarboxylic acid can be prepared by well known methods and can include an ester, an amide, an amine salt, a hydroxyalkyl-substituted amide, an aminoalkyl-substituted ester, an alkoxylated acid such as monoalkoxylated and/or polyalkoxylated acids, or a mixture thereof. The alcohol, amine, amino alcohol and epoxide reactants are the same as described hereinabove for the reactants used to form derivatives of the polycarboxylic acid or anhydride of surfactant component (c)(2). The fatty monocarboxylic acid can be alkoxylated by reacting it with a glycol such as ethylene glycol or a poly(alkylene glycol) such as a poly(ethylene glycol) as described in International Publication No. WO 01/62877 A1.

The surfactant (c) alkoxylated hydrocarbylphenol can include a reaction product of a hydrocarbylphenol as described above for the hydrocarbylphenol of component (c)(1) with one or more units of a single epoxide or a mixture of two or more different epoxides as described above for the alkoxylated Mannich base of component (c)(1). Alkoxylated hydrocarbylphenols can be prepared by well known methods and are commercially available.

The surfactant (c) of the present invention has a certain hydrophilic-lipophilic balance (HLB) value that can be determined using the method described by John C. McGowan in "A New Approach for the Calculation of HLB Values of Surfactants," Tenside Surf. Det., 1990, 4, pp. 229–230. Preferred surfactants will generally have HLB values ranging from –30 to 20 and in other instances have HLB values ranging from –30 to 10, –20 to 10, –7 to 20, and –15 to 8. The aromatic content of the fuel frequently will indicate more useful HLB value ranges for the surfactant. Typically, the HLB value of the surfactant will be directly proportional to the aromatic content of the diesel fuel— higher HLB value surfactants being used with diesel fuels containing high levels of aromatics and lower HLB value surfactants being used with diesel fuels having a lower aromatic content. Moreover, the treatment levels of surfactant are generally inversely proportional to the HLB value of the surfactant; that is, for a fuel having a given aromatic content, higher HLB value surfactants may be used in smaller amounts than lower HLB value surfactants. Mixtures of surfactants may be used. As an example of a surfactant having a useful HLB value is a mixture of the reaction product of hexadecenylsuccinic anhydride and N,N-dimethylethanolamine and oleylamine in a ratio that delivers a HLB value of 5.6.

The surfactant component (c) can be present in the fuel composition of the present invention at 0.1 to 8% by weight and in other instances can be present at 0.3 to 7% by weight, and at 0.5 to 6% by weight.

Several surfactant compositions of this invention are illustrated in Table 2.

TABLE 2

Surfactant Compositions

| Example | $C_7$Phenol | $C_{12}$Phenol | Tall Oil Fatty Acid | Oleic Acid | * | Other |
|---|---|---|---|---|---|---|
| 1 | 90 | | 5 | | 5 | |
| 2 | 72 | | 4 | | 4 | 20** |
| 3 | | 90 | 5 | | 5 | |
| 4 | 80 | | 10 | | 10 | |
| 5 | | 35 | | 65 | | |
| 6 | | 50 | | 50 | | |
| 7 | | | | 100 | | |
| 8 | | | | 50 | 50 | |
| 9 | | | | | | 100*** |
| 10 | | | | | | 100**** |
| 11 | 90 | | | | | 10***** |
| 12 | 97.5 | | 1.25 | | 1.25 | |

*$C_{16}$ succinic anhydride/N,N-dimethylethanolamine reaction product
**2-Ethyl Hexanol
***Tall Oil Fatty Acid/dimethylethanolamine reaction product
****Oleic acid/$NH_3$ reaction product
*****Mannich Base from reaction of dodecylphenol, formaldehyde and diethanolamine The ethanol-diesel fuel composition of the present invention can further comprise (d) a combustion improver that reduces exhaust emissions of a compression-ignited internal combustion engine. Addition of a combustion improver to the fuel composition of the present invention can enhance the combustion characteristics of the fuel composition to include reducing levels of regulated and unregulated engine exhaust emissions, reducing engine noise, improving engine cold start, and increasing engine longevity as a consequence of reducing rapid pressure rise associated with poor combustion. Regulated emissions include hydrocarbons, carbon monoxide, nitrogen oxides, and particulate matter while unregulated emissions include carbonyls, formaldehyde, and acetaldehyde. The combustion improver can include a peroxide compound such as hydrogen peroxide and di-t-butyl peroxide, an organic nitrite such as ethyl nitrite, an organic nitrate such as 2-ethylhexyl nitrate, an inorganic nitrate salt such as ammonium nitrate, a hydroxylamine compound to include for example hydroxylamine and the organic amine N,N-diethylhydroxylamine and the salt hydroxylamine nitrate, an organic nitro compound such as 2-nitropropane, a compound having at least one strained ring group containing 3 to 5 ring atoms such as 2,5-dimethoxytetrahydrofuran, an organic nitramine such as methylnitramine, or a mixture thereof. In another embodiment of the invention the combustion improver can include an inorganic nitrate salt, a hydroxylamine compound, an organic nitro compound, a compound having at least one strained ring group containing 3 to 5 ring atoms, or a mixture thereof. In a further embodiment of the invention the combustion improver can include a hydroxylamine compound, a compound having at least one strained ring group containing 3 to 5 ring atoms, or a mixture thereof. The combustion improvers of the present invention can include a hydroxylamine compound, an organic nitro compound, a compound having at least one strained ring group containing 3 to 5 ring atoms, an organic nitrite, and an organic nitramine as described in International Publication No. WO 02/068334 A1. The combustion improvers of the present invention can be prepared by known methods and are commercially available. The combustion improver (d) as described above can be added to the fuel composition of the present invention containing a diesel fuel, ethanol and the surfactant (c) as described hereinabove. The combustion improver (d) can be present in the fuel composition of the present invention at 0.005 to 10% by weight and in other instances can be present at 0.01 to 5% by weight, and at 0.05 to 2% by weight.

The fuel composition of the present invention may contain other additives that are well known to those skilled in the art. These can include supplemental combustion improvers such as those mentioned hereinabove (cetane number improvers for diesel fuels such as alkyl nitrates), dyes, antioxidants such as hindered phenols, lubricity agents, cold flow improvers, dispersants, rust inhibitors such as alkylated succinic acids and anhydrides and derivatives thereof, bacteriostatic agents, detergents, gum inhibitors, fluidizers, metal deactivators, demulsifiers, anti-icing agents, corrosion inhibitors, and the like. The fuel composition of this invention may include a lead-containing or lead-free fuel, but usually includes a lead-free fuel.

The fuel composition of this invention is prepared by mixing the various components in any order. More often, the diesel fuel is mixed with ethanol, the surfactant is then added, and then the combustion improver and any other components are added. Alternatively, the diesel fuel is mixed with the surfactant to which mixture is added ethanol, and then the combustion improver and any other components are added.

The fuel composition of the present invention, as described hereinabove with performance advantages illustrated in the examples hereinbelow, provides an ethanol-containing diesel fuel that is stable to phase separation, that provides improved lubricity to the components of a fuel system of a compression-ignited internal combustion engine, and that reduces exhaust emissions of the engine. In an embodiment of the present invention a method of operating a compression-ignited internal combustion engine comprises fueling the engine with the fuel composition containing diesel fuel, ethanol and the surfactant (c) comprising one or more of the components (c)(1), (c)(2), (c)(3) or (c)(4). In another embodiment of the method of operating the engine the fuel composition contains the surfactant (c) comprising one or more components as described hereinabove and optionally the combustion improver (d) as described hereinabove.

In an embodiment of the invention a method of providing a stable fuel composition that contains diesel fuel and ethanol comprises adding a sufficient amount of the surfactant (c) as described hereinabove and optionally the combustion improver (d) as described hereinabove to the fuel composition.

In another embodiment of the invention a method of improving the lubricity of a fuel composition that contains diesel fuel and ethanol comprises adding a sufficient amount of the surfactant (c) as described hereinabove and optionally the combustion improver (d) as described hereinabove to the fuel composition.

In a further embodiment of the invention a method of reducing exhaust emissions of a compression-ignited internal combustion engine comprises fueling the engine with the fuel composition containing diesel fuel, ethanol, the surfactant (c) as described hereinabove, and the combustion improver (d) as described hereinabove.

In another embodiment of the invention a method of providing a stable fuel composition to a compression-ignited internal combustion engine wherein the fuel composition provides improved lubricity and reduced exhaust emissions comprises operating the engine with the fuel composition containing diesel fuel, ethanol, the surfactant (c) as described above, and the combustion improver (d) as described above.

The fuel composition and methods of this invention are illustrated in the examples of the following tables. It should be understood that these examples are solely for the purpose of illustration, and are not intended to limit the scope of the invention.

Stability Data

TABLE 3

Stability data for Diesel Fuel + 10 wt. % Ethanol + x % Water + x % Surfactant

| Water, Wt. % | Surfactant Example No. | Weight % | Diesel Fuel[1] | Lowest Stable Temperature −18° C., 0° C., 20° C. | Cloud Point ASTM D-2500 |
|---|---|---|---|---|---|
| 0 | None | 0 | A | None | 25.5° C. |
| 0.025 | 1 | 2.0 | A | 20° C. | 8° C. |
| 0.025 | 1 | 2.5 | A | 0° C. | 1.5° C. |
| 0.025 | 1 | 3.0 | A | 0° C. | −2.8° C. |
| 0.025 | 6 | 3.0 | A | 20° C. | 2.6° C. |
| 0.025 | 7 | 3.0 | A | 20° C. | 1.7° C. |
| 0.025 | 8 | 3.0 | A | 20° C. | 4.2° C. |
| 0.05 | 1, 6 | 0.8 | A | None | |
| 0.01 | 1 | 3.74 | A | 20° C. | 14.2° C. |
| 0.01 | 3 | 3.74 | A | 20° C. | 19.1° C. |
| 0.01 | 3 + (d)[2] | 3.74 | A | 20° C. | 8.7° C. |
| 0.3 | 1 | 5.5 | A | 20° C. | 20.7° C. |
| 0 | None | 0 | B | None | 17.7° C. |
| 0.025 | 11 | 3.0 | B | −18° C. | −20° C. |
| 0.025 | 1 | 3.0 | B | 0° C. | −9° C. |

[1]Diesel Fuel was a middle distillate as described in Table 1
[2](d) was combustion improver 2-ethylhexyl nitrate The effectiveness of surfactant (c) components of the present invention in providing phase stability to a mixture of a diesel fuel and ethanol is demonstrated in the stability data of Table 3 above.

Lubricity Data

Mixtures of a standard diesel fuel and ethanol containing surfactant (c) components of the present invention were evaluated for lubricity/wear in the ASTM D6079 High Frequency Reciprocating Rig (HFRR) Test against standard diesel fuel and a mixture of standard diesel fuel and ethanol. The HFRR Test corresponds well on lubricity/wear performance when compared to actual diesel fuel pump wear tests. The HFRR Test results in Table 4 demonstrate the effectiveness of the surfactant (c) components of the present invention in improving the lubricity of a fuel composition containing diesel fuel and ethanol.

TABLE 4

ASTM D6079 HFRR Test Lubricity/Wear Data

| Diesel Fuel | % Ethanol | % Water | Example No. | Surfactant Weight % | Wear scar, mm @ 60° C. | @ 25° C. |
|---|---|---|---|---|---|---|
| BP Supreme | 0 | 0 | None | 0 | 0.46 | 0.36 |
| BP Supreme | 10 | 0.2 | 11 | 2.5 | 0.377 | 0.29 |
| BP Supreme | 10 | 0 | 5 | 4.0 | | 0.19 |
| Haltermann | 0 | 0 | None | 0 | 0.565 | 0.36 |
| Haltermann | 10 | 0.03 | None | 0 | 0.584 | 0.49 |
| Haltermann | 10 | 0.03 | 11 | 2.5 | 0.366 | 0.35 |
| Haltermann | 10 | 0.03 | 1 | 2.0 | 0.237 | 0.26 |
| Haltermann | 10 | 0.03 | 1 | 1.0 | 0.265 | 0.32 |
| Haltermann | 10 | 0.03 | 12 | 1.0 | 0.417 | 0.37 |

Emissions Data

Tables 5 and 6 present emissions data that demonstrate the effectiveness of the combustion improver (d) of the present invention in reducing emissions when a compression-ignited internal combustion engine is fueled or operated with a fuel composition containing a diesel fuel and ethanol.

A 1.9 liter VW Jetta diesel engine was run in the U.S. Code of Federal Regulations US06 vehicle test procedure on a) a base diesel fuel, b) a blend of the base diesel fuel, 10 wt. % fuel grade ethanol and 1 wt. % surfactant of Example 1 from Table 2 (Blend A), and c) a blend of the base diesel fuel, 10 wt. % fuel grade ethanol, 1 wt. % surfactant of Example 1 from Table 2 and 5200 ppm by wt. of the combustion improver 2-ethylhexyl nitrate. The base diesel fuel had a low sulfur content, 25.4% by volume aromatic hydrocarbons content, a 43.2 cetane number, and a 90% distillation temperature of 307° C. Both regulated and unregulated emissions were measured. Regulated emissions included hydrocarbons (HC), nitrogen oxides ($NO_x$), carbon monoxide (CO) and particulate matter (PM). Unregulated emissions included carbonyls, formaldehyde and acetaldehyde that can be due largely to incomplete combustion of ethanol. The data in Table 5 clearly show the benefit of reducing exhaust emissions by including a combustion improver in the ethanol-diesel fuel blend.

TABLE 5

1.9 l VW Jetta CFR US06 Vehicle Test Emissions From Diesel Fuel-Ethanol Blend With or Without Combustion Improver Relative to Base Diesel Fuel

| | % Change in Emissions Relative to Base Diesel Fuel | |
|---|---|---|
| Emissions Measurement | Blend A Without Combustion Improver | Blend B With Combustion Improver |
| HC | 11.6% | 4.2% |
| NOx | 19.5% | 12.4% |
| CO | 19.8% | −7.3% |
| PM | −17.1% | −19.7% |
| Carbonyls | 35.8% | 4.1% |
| Formaldehyde | 28.3% | 3.6% |
| Acetaldehyde | 64.3% | 15.2% |

A Caterpillar 1P engine procedure was run to measure particulate matter or soot emissions on a) a diesel fuel, b) a surfactant-ethanol-diesel fuel blend and c) surfactant-ethanol-diesel fuel blends containing various combustion improvers. The data in Table 6 show the advantage of reducing emissions by including a combustion improver (d) of the present invention in the ethanol-diesel fuel blend.

TABLE 6

Caterpillar 1P Engine Soot Emissions for Diesel Fuel and Ethanol-Diesel Fuel Blends With and Without Combustion Improver

| Example | Fuel Identity | Combustion Improver, 0.5 wt. % | Soot, mg |
|---|---|---|---|
| 13 | Diesel Fuel | None | 100 |
| 14 | Ethanol-Diesel Fuel Blend[1] | None | 90 |
| 15 | Ethanol-Diesel Fuel Blend[1] | DMTHF[2] | 104 |
| 16 | Ethanol-Diesel Fuel Blend[1] | DEHA[3] | 66 |
| 17 | Ethanol-Diesel Fuel Blend[1] | NP[4] | 55 |
| 18 | Ethanol-Diesel Fuel Blend[1] | 2-EHN[5] | 75 |

[1]Ethanol-diesel fuel blend was diesel fuel, 15 wt. % fuel grade ethanol and 2 wt. % surfactant
[2]DMTHF was 2,5-dimethoxytetrahydrofuran
[3]DEHA was N,N-diethylhydroxylamine
[4]NP was 2-nitropropane
[5]2-EHN was 2-ethylhexyl nitrate Each of the documents referred to in this Detailed Description of the Invention section is incorporated herein by reference as well as U.S. Provisional Application Nos. 60/364,256 filed 14 Mar. 2002, 60/418,935 filed 16 Oct. 2002, and 60/426,199 filed 14 Nov. 2002, from which this application claims a benefit. All numerical quantities in this application used to describe or claim the present invention are understood to be modified by the word "about" except for the examples or where explicitly indicated otherwise. All chemical treatments or contents throughout this application regarding the present invention are understood to be as actives unless indicated otherwise even though solvents or diluents may be present.

What is claimed is:

1. A fuel composition, comprising:
   (a) a diesel fuel;
   (b) ethanol; and (c) a surfactant comprising
(1) a hydrocarbylphenol or derivative thereof that is a Mannich base or an alkoxylated Mannich base;
(2) a reaction product of a hydrocarbyl-substituted polycarboxylic acid or anhydride and an alcohol, an amine, an amino alcohol, an epoxide, or a mixture thereof; or
(3) a mixture thereof wherein the hydrocarbyl substituent of components (c)(1) and (c)(2) contains 4 to 20 carbon atoms; the ethanol comprises anhydrous ethanol containing up to about 0.1% by weight water, fuel grade ethanol containing up to 0.1% by weight water, or mixtures thereof; the diesel fuel is present at 50 to 99% by weight; the ethanol is present at 0.5 to 25% by weight; and the surfactant is present at 0.1 to 8% by weight and has a HLB value ranging from −30 to 20.

2. The fuel composition of claim 1 wherein the surfactant (c) further comprises at least one member selected from the group consisting of an alcohol, an alkoxylated alcohol, a fatty monocarboxylic acid or derivative thereof, and an alkoxylated hydrocarbylphenol.

3. The fuel composition of claim 2 wherein the diesel fuel contains aromatic hydrocarbons from 3 to 60% by volume, and the HLB value of the surfactant is directly proportional to the aromatic content of the diesel fuel.

4. The fuel composition of claim 2 wherein the derivative of the fatty monocarboxylic acid is an ester, an amide, an amine salt, a hydroxyalkyl-substituted amide, an aminoalkyl-substituted ester, an alkoxylated acid, or a mixture thereof.

5. The fuel composition of claim 2, further comprising:
(d) a combustion improver.

6. The fuel composition of claim 5 wherein the combustion improver comprises an inorganic nitrate salt, a hydroxylamine compound, an organic nitro compound, a compound having at least one strained ring group containing 3 to 5 ring atoms, or a mixture thereof.

7. The fuel composition of claim 1 wherein the surfactant comprises the Mannich base, the alkoxylated Mannich base, or a mixture thereof.

8. The fuel composition of claim 7 wherein the Mannich base is prepared by the Mannich reaction of a hydrocarbylphenol, an aldehyde, and an amine.

9. The fuel composition of claim 8 wherein the Mannich base is the reaction product of dodecylphenol, formaldehyde, and diethanolamine.

10. The fuel composition of claim 1 wherein component (c)(2) is the reaction product of an alkenylsuccinic anhydride and a tertiary amino alcohol.

11. The fuel composition of claim 1 wherein the diesel fuel comprises a middle distilate fuel, a Fischer-Tropsch fuel, a biodiesel fuel, or mixtures thereof.

12. The fuel composition of claim 5 wherein the diesel fuel is present at 55 to 99% by weight, the surfactant is present at 0.3 to 7% by weight, and the combustion improver is present at 0.005 to 10% by weight.

13. A method of operating a compression-ignited internal combustion engine, comprising:
fueling the engine with the fuel composition of claim 1.

14. The method of claim 13 wherein the surfactant (c) further comprises at least one member selected from the group consisting of an alcohol, an alkoxylated alcohol, a fatty monocarboxylic acid or derivative thereof, and an alkoxylated hydrocarbylphenol.

15. The method of claim 13 wherein the fuel composition further comprises (d) a combustion improver.

16. A method of fueling a compression-ignited internal combustion engine, comprising:
fueling the engine with the fuel composition of claim 1.

17. The method of claim 16 wherein the fuel composition further comprises (d) a combustion improver.

* * * * *